(12) United States Patent
Galford

(10) Patent No.: US 10,310,134 B2
(45) Date of Patent: Jun. 4, 2019

(54) API UNIT CALIBRATION OF GAMMA RAY LOGGING TOOLS USING SIMULATED DATA

(71) Applicant: Halliburton Energy Services, Inc., Houston, TX (US)

(72) Inventor: James E. Galford, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/517,791

(22) PCT Filed: Sep. 12, 2016

(86) PCT No.: PCT/US2016/051246
§ 371 (c)(1),
(2) Date: Apr. 7, 2017

(87) PCT Pub. No.: WO2017/069865
PCT Pub. Date: Apr. 27, 2017

(65) Prior Publication Data
US 2018/0217293 A1 Aug. 2, 2018

Related U.S. Application Data

(60) Provisional application No. 62/245,008, filed on Oct. 22, 2015.

(51) Int. Cl.
*G01V 13/00* (2006.01)
*G01V 5/04* (2006.01)
(Continued)

(52) U.S. Cl.
CPC .......... *G01V 13/00* (2013.01); *E21B 41/0092* (2013.01); *E21B 47/09* (2013.01);
(Continued)

(58) Field of Classification Search
CPC ........................... G01V 13/00; E21B 41/0092
See application file for complete search history.

(56) References Cited

U.S. PATENT DOCUMENTS 4,493,998 A * 1/1985 Smith, Jr. ................ G01V 5/04
250/252.1
4,574,193 A 3/1986 Arnold et al.
(Continued)

OTHER PUBLICATIONS

International Search Report and The Written Opinion of the International Search Authority, or the Declaration, dated Feb. 7, 2017, PCT/US2016/051246, 24 pages, ISA/KR.
(Continued)

*Primary Examiner* — Michael C Bryant
(74) *Attorney, Agent, or Firm* — Haynes and Boone, LLP

(57) ABSTRACT

Gamma ray logging tools are calibrated using gamma emissions data simulated using Monte Carlo modeling techniques. During the simulation, one or more nuclear activity zones of a formation are modeled and photon counting rates are determined. Using the simulated counting rates, an American Petroleum Institute ("API") unit sensitivity factor is calculated. The API unit sensitivity factor is then applied to convert real logging tool counting responses into API units.

19 Claims, 9 Drawing Sheets

| Tool | API Gamma Ray Pit Zone | Modeled Counting Rate (cps) | Measured Counting Rate (cps) | Modeled Sensitivity (API/cps) | Experimental Sensitivity (API/cps) | Sensitivity Percent Difference |
|---|---|---|---|---|---|---|
| Wireline A | Low-Activity | 69.2 | 70.1 | 0.281809 | 0.279720 | 0.7% |
| | High-Activity | 778.9 | 785.1 | | | |
| Wireline B | Low-Activity | 47.6 | 49.6 | 0.404208 | 0.397852 | 1.6% |
| | High-Activity | 542.4 | 552.3 | | | |
| LWD C | Low-Activity | 2.04 | 2.42 | 9.894759 | 9.955677 | 0.6% |
| | High-Activity | 22.25 | 22.51 | | | |

(51) Int. Cl.
*E21B 41/00* (2006.01)
*E21B 47/09* (2012.01)
*E21B 49/00* (2006.01)
*E21B 47/12* (2012.01)
*E21B 47/18* (2012.01)

(52) U.S. Cl.
CPC ............... *E21B 49/00* (2013.01); *G01V 5/04* (2013.01); *E21B 47/124* (2013.01); *E21B 47/18* (2013.01)

(56) References Cited

U.S. PATENT DOCUMENTS 8,731,888 B2 * 5/2014 Yin ................... G06F 17/5009
250/250

2007/0284518 A1 12/2007 Randall
2008/0265151 A1 10/2008 Gadot
2012/0075953 A1 3/2012 Chace et al.

OTHER PUBLICATIONS

Belknap, et al., "API Calibration Facility for Nuclear Logs," *Drilling and Production Practice*, American Petroleum Institute, pp. 289-316., 1959.
Briesmeister, "MCNP-A General Monte Carlo N-Particle Transport Code, Version 4C," LA-13709M.
Flanagan, et al., "A New Generation Nuclear Logging System," 32$^{nd}$ *SPWLA Annual Logging Symposium*, Jun. 16-19, 1991.
Hendriks, et al., "MCNP Modelling of Scintillation-Detector γ-Ray Spectra From Natural Radionuclides," *Applied Radiation and Isotopes*, vol. No. 57, pp. 449-457, Mar. 22, 2002.
Wahl, "Gamma-Ray Logging," *Geophysics*, vol. 48, No. 11, pp. 1536-1550, Nov. 1983.

* cited by examiner

| Tool | API Gamma Ray Pit Zone | Modeled Counting Rate (cps) | Measured Counting Rate (cps) | Modeled Sensitivity (API/cps) | Experimental Sensitivity (API/cps) | Sensitivity Percent Difference |
|---|---|---|---|---|---|---|
| Wireline A | Low-Activity | 69.2 | 70.1 | 0.281809 | 0.279720 | 0.7% |
|  | High-Activity | 778.9 | 785.1 |  |  |  |
| Wireline B | Low-Activity | 47.6 | 49.6 | 0.404208 | 0.397852 | 1.6% |
|  | High-Activity | 542.4 | 552.3 |  |  |  |
| LWD C | Low-Activity | 2.04 | 2.42 | 9.894759 | 9.955677 | 0.6% |
|  | High-Activity | 22.25 | 22.51 |  |  |  |

FIG. 6

| Tool | Formation | Modeled Value (API units) | Measured Value (API units) | API Value Percent Difference |
|---|---|---|---|---|
| Wireline A | New Granite Blocks | 160.6 | 164.2 | 2.2% |
| Wireline B | New Granite Blocks | 158.6 | 161.9 | 2.0% |
| LWD C | Old Granite Blocks | 202.9 | 205.2 | 1.1% |

FIG. 7

API UNIT CALIBRATION OF GAMMA RAY LOGGING TOOLS USING SIMULATED DATA

PRIORITY

The present application is a U.S. National Stage patent application of International Application No. PCT/US2016/051246, filed on Sep. 12, 2016, which claims the benefit of U.S. Provisional Application No. 62/245,008, entitled "API UNIT CALIBRATION OF GAMMA RAY LOGGING TOOLS USING SIMULATED DATA," filed on Oct. 22, 2015, also naming James E. Galford as inventor, the disclosures of which are incorporated herein by reference in their entirety.

FIELD OF THE DISCLOSURE

Embodiments and methods of present disclosure generally relate to the calibration of gamma ray logging tools and, more particularly, to the use of simulated gamma ray emission data in converting logging tool counting rate responses to American Petroleum Institute ("API") units.

BACKGROUND

The gamma ray pit at the University of Houston API Calibration Facilities defines the API unit for natural gamma ray logs used throughout the petroleum logging industry. The gamma ray pit includes stacked slabs of various porosity quarried limestone and an adjacent pit comprised of three 8-ft layers of cement having relatively low and high radioactivity levels. The facility was intended to provide calibration standards to unify log responses among service companies for neutron porosity and natural gamma ray logs. The pits were used to establish API units for both types of logs. For neutron logs, the API unit was defined as $\frac{1}{1000}^{th}$ of the response in the 19 p.u. limestone formation. For gamma ray logs, the API unit was defined as $\frac{1}{200}^{th}$ of the difference between responses from the high-activity and the lowermost low-activity zones.

The API unit definition for neutron porosity logs failed to survive the 1960s, and all modern neutron logs are now calibrated in porosity units. The API unit remains the industry standard for gamma ray logs and it is unlikely a newly defined unit will gain favor after almost 60 years of usage.

The API gamma ray pit, however, presents a number of challenges. When the pit was designed and built, modest-sized wireline tools were capable of operating in all of the known logging environments, and logging-while-drilling ("LWD") instruments had not been discovered. Consequently, the design for the pit included a borehole that accommodated contemporary tools with little allowance for development of larger wireline tools or most LWD tools. The 4.9-in. inside diameter of the steel casing lining the pit barely accommodates tools recently developed for deep-water Gulf of Mexico exploration. Moreover, future wireline tools for high-pressure logging environments may also exceed the capabilities of the API facility.

In addition to its size limitations and the university's desire to repurpose the site, the API Calibration Facilities are rapidly deteriorating. Over the last decade, corrosion has completely destroyed the steel casing protruding from the pit at the surface. While the condition of the steel casing below the surface is unknown, it is probable that corrosive processes are also at work within the pit. Because the presence of the steel casing is an integral part of the API unit definition, subsurface deterioration of the casing is gradually altering the definition of the API unit and at some point the pit will become unusable. In addition, the facility's usefulness has diminished over the years in part because larger service companies have built their own tool response laboratories whose capabilities permit operations beyond those allowed at the API facility.

Thus, it is important to explore alternatives to preserve the essential features that form the basis of the definition for the API unit as an industry standard going forward. However, there is little interest among the major service companies to fund construction of a replacement facility or to attempt to relocate the existing pits.

BRIEF DESCRIPTION OF THE DRAWINGS

FIG. 6 shows a Table 2 which summarizes the results and compares the simulated API unit sensitivity factors with values derived from actual measurements done with the tools in the API gamma ray pit;

FIG. 7 is a Table 3 that shows how predicted results compare favorably with measured API unit values to thereby demonstrate the viability of the digital proxy calibration methods described herein;

DESCRIPTION OF ILLUSTRATIVE EMBODIMENTS

Illustrative embodiments and related methods of the present disclosure are described below as they might be employed in systems and methods for API unit calibration of logging tools using simulated gamma ray emissions data. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, the present disclosure is directed to systems and methods for calibrating gamma ray logging tools using simulated data. A generalized embodiment begins by simulating gamma ray emissions of a formation using Monte Carlo modeling. During the simulation, one or more radioactive zones of a formation are modeled and the photon (i.e., gamma ray) counting rates are determined. Using the simulated counting rates, an API unit sensitivity factor for the simulated logging tool is calculated. When a logging tool designed in accordance to the simulated tool is deployed downhole, its counting rate responses are converted into API units using the API unit sensitivity factor. Thus, the illustrative gamma ray pit models described herein replace the empirical derivation of tool sensitivity factors using the API gamma ray pit and, therefore, also remove its accompanying challenges.

Figure 1:
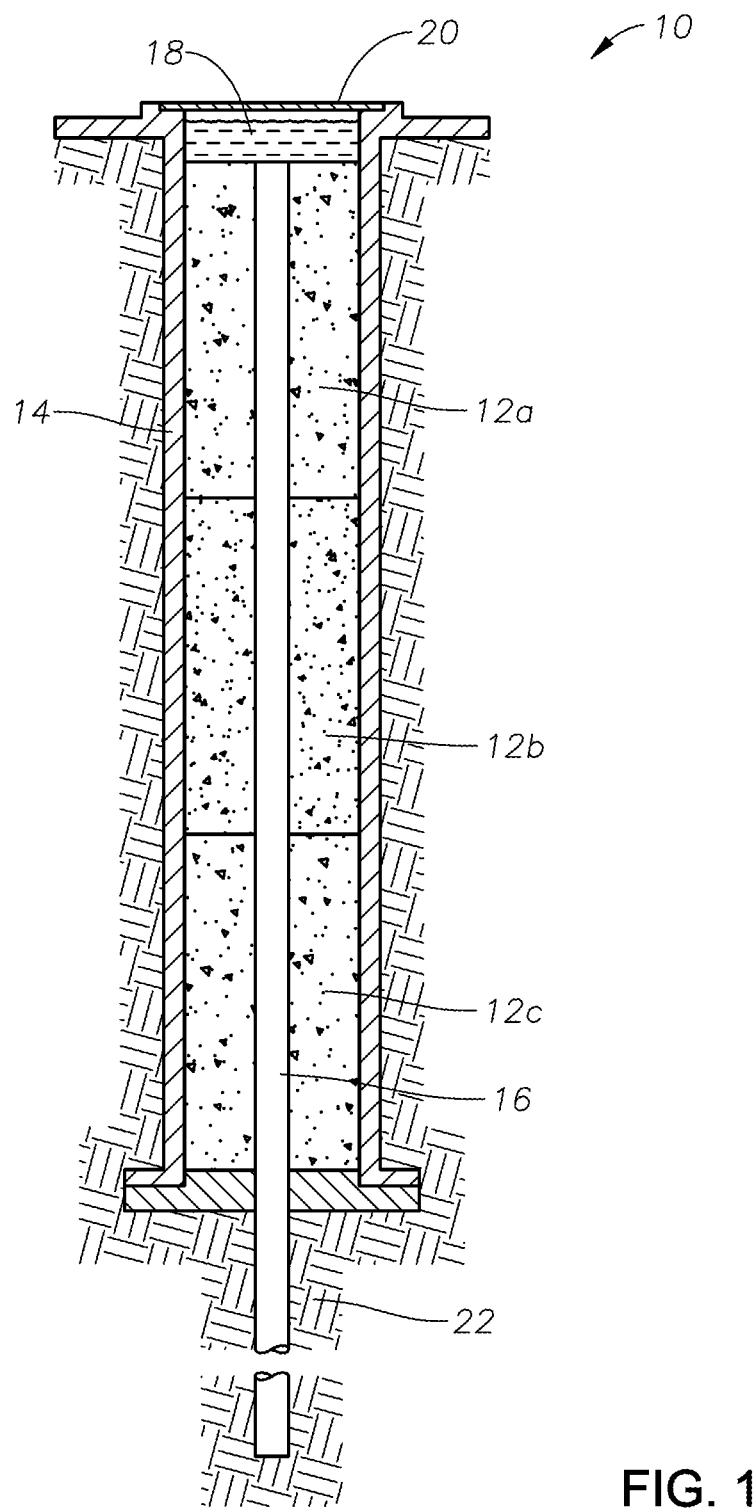
FIG. 1 is a graphical illustration of the API Calibration Facility gamma ray pit, and useful to explain certain aspects of the present disclosure.

FIG. 1 is a graphical illustration of the API Calibration Facility gamma ray pit, and useful to explain certain aspects of the present disclosure. Pit 10 consists of three 8-ft thick, 4-ft diameter layers of concrete 12a-c that are large enough to effectively be of infinite extent to gamma ray detectors. A high-activity zone 12b includes high radioactive concrete and is located between upper low activity zone 12a and lower low activity zone 12c, which are both comprised of lower activity concrete. High activity and low activity are relative terms, which indicate high and low radioactivity in comparison to one another. Pit 10 is lined 4-ft diameter corrugated pipe 14 surrounding the layers of cement 12a-c; the inside diameter is nominally 4.9 inches. Upper low-activity zone 12a essentially acts as a cosmic ray shield and is not used for calibration purposes. High-activity zone 12b was created by blending mica, monazite sand, and Ottawa sand in proportions spelled out Belknap, W. B., et al., 1959, "API Calibration Facility for Nuclear Logs," *Drilling and Production Practice*, American Petroleum Institute, 289-316 (the "Belknap publication"), with the intent of representing twice the radiation of an "average" marine shale. Thus, high-activity zone 12b was targeted to contain a blend of 24 ppm thorium, 12 ppm uranium, and 4% potassium by weight. However, the API Calibration Facility is not a sanctioned gamma ray spectroscopy calibration standard. Pit 10 is covered with a layer of water 18 and a steel deck plate 20. A 17-lbm/ft, 5½-inch outside diameter steel casing 16 traverses concrete layers 12a-c down below into earth 22.

In certain illustrative methods of the present disclosure, the API unit of gamma radiation is defined as $1/200^{th}$ of the difference between counting rates observed in high activity zone 12b and lower low activity zone 12c, and can be expressed as:

$$200/(HAZ_{cps} - LAZ_{cps}) \quad \text{Eq. (1)},$$

where $HAZ_{cps}$ is the counting rate of high activity zone 12b in counts per second, and $LAZ_{cps}$ is the counting rate of low activity zone 12c. It is important to note the gamma ray pit subcommittee settled upon the middle (4-ft level) of high-activity zone 12b as the official calibration point. Because the radioactive constituents, most notably uranium, are not uniformly distributed vertically throughout high-activity zone 12b, accurate positioning of the logging tool detector in the vertical center of zone 12b is essential to insure a valid calibration using conventional approaches.

As previously mentioned, the illustrative embodiments and methods described herein apply Monte Carlo modeling to calibrate gamma ray logging tools. The Los Alamos National Laboratory Monte Carlo N-Particle ("MCNP") computer code is well-suited to modeling the transport of gamma rays through a three-dimensional geometry and their subsequent detection by a logging tool deployed in a wellbore. Therefore, in certain illustrative embodiments of the present disclosure, the MCNP code is utilized.

Figure 2:
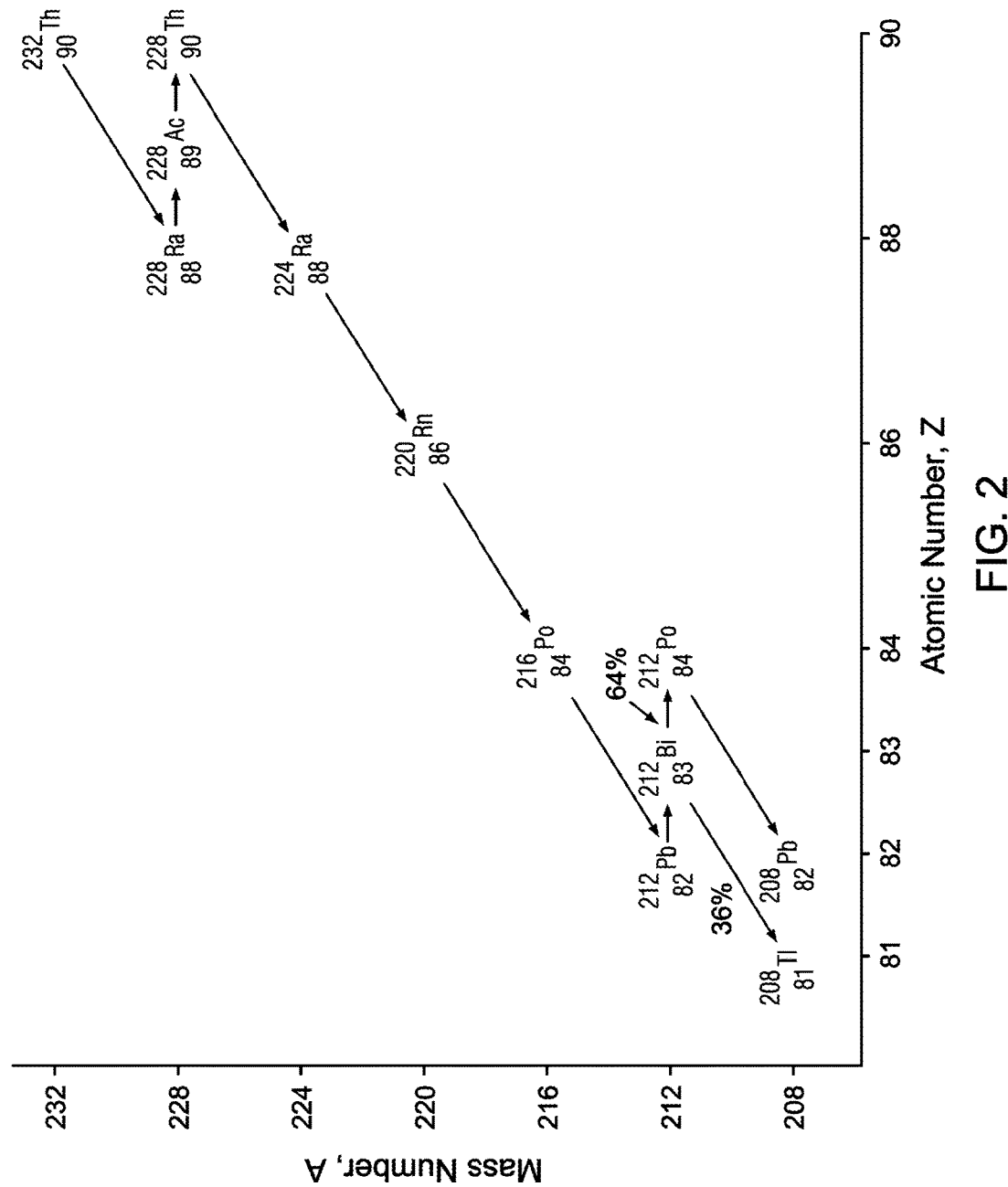
FIGS. 2 and 3 are graphs plotting the thorium and uranium decay series, respectively.
Figure 3:
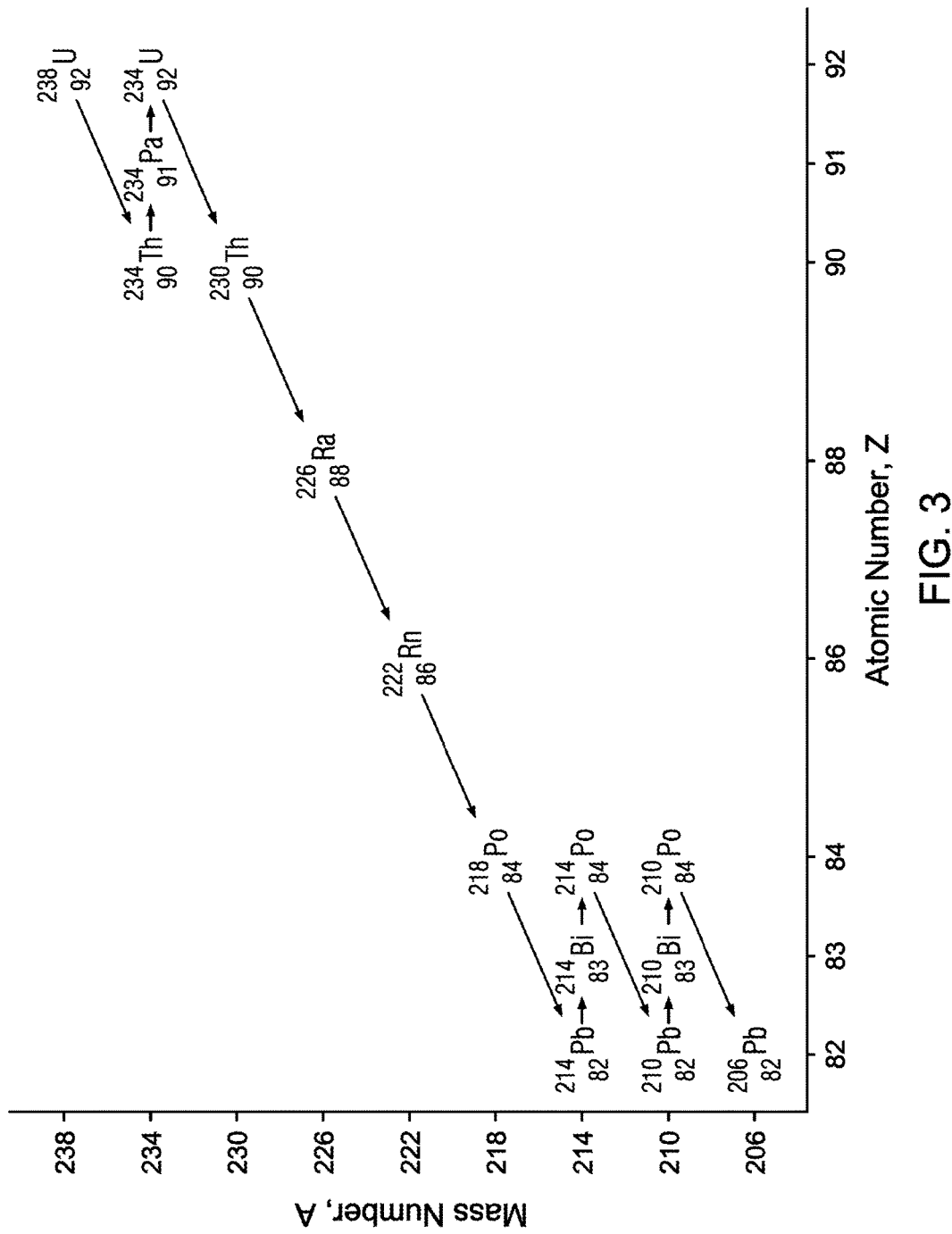
Figure 4:
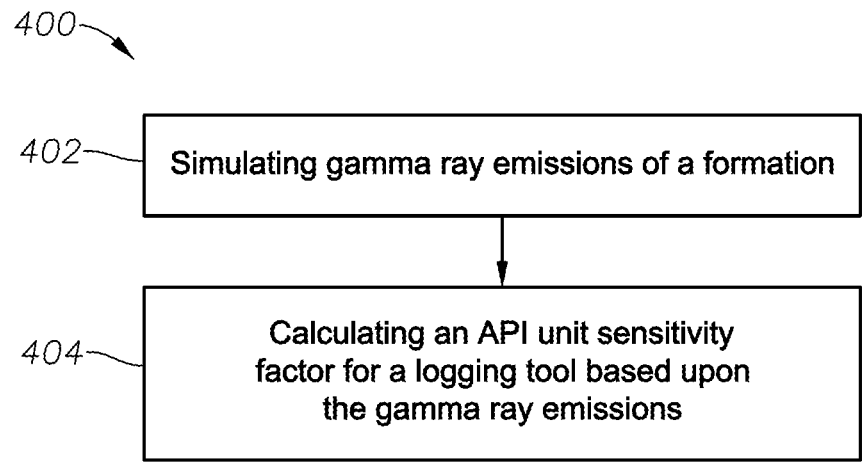
FIG. 4 is a flow chart of a general method for generating a Monte Carlo calibration model, according to certain illustrative methods of the present disclosure.

To obtain calibrated, absolute gamma ray counting rates in certain embodiments herein, several components are combined within a MCNP model which allows the model to replace the API gamma ray pit. FIG. 4 is a flow chart of a general method for generating a Monte Carlo calibration model, according to certain illustrative methods of the present disclosure. In method 400, gamma ray emissions (i.e., gamma ray emissions data) of a formation are simulated at block 402. Here, a list of relevant gamma ray emissions for each simulated element source must be assembled. Natural potassium gamma rays arise from disintegration of the $^{40}K$ isotope which results in the emission of 1.46-MeV gamma rays. The elemental sources thorium and uranium have gamma rays that originate from complex decay chains, as shown in FIGS. 2 and 3—which show thorium and uranium decay series, respectively. As shown, decay product isotopes are assumed to exist in earth formations in a state of secular equilibrium. A multitude of gamma rays are emitted from numerous isotopes in the respective decay chains that combine to produce observed responses to each element. The thorium series of FIG. 2 emanates from the decay of $^{232}Th$. Natural uranium decays by way of two decay series; one emanating from $^{238}U$ and the other from $^{235}U$. Of these, the $^{238}U$ decay chain is the only one important to natural gamma ray logging because $^{235}U$ amounts to approximately 0.72% of natural uranium atoms compared to 99.2745% for $^{238}U$.

Numerous photon emissions are produced from the decay processes in the thorium and uranium decay chains. Thus, specific photon activities for each simulated elemental source must be calculated, as discussed below with regard to Equation 2. Approximately 362 separate photon emissions, excluding x-rays, are produced by isotopes in the thorium decay series according to information contained in the Table of Radioactive Isotopes. Similarly, approximately 898 photon emissions are produced from decays comprising the uranium series. As will be described in more detail below, to simulate photon emissions from thorium and uranium, elemental probability distributions are constructed for each elemental source to thereby sample the gamma ray energies the MCNP model will track.

In certain illustrative methods of the present disclosure, the decay chain probability distributions are configured according to the intensity or number of photons produced per decay of the parent isotope. Many of the decay chain photon emissions are not important to the simulation of logging tool responses and can be discriminated to aid computational efficiency. Experience has shown that good fidelity with experimental results can be achieved if emissions that comprise less than 0.4% of the emissions for the decay chain, and whose energy is less than approximately 180 keV, are discriminated from the probability distribution; different discrimination criteria may be selected depending on the particular gamma ray sensor design. Doing this significantly reduces the number of photon energies that must be tracked in the simulation and it ensures the most important emissions are well-sampled. For example, in certain illustrative embodiments, 40 discreet photon energies ranging in energy from 209 to 2614 keV adequately simulates the thorium series for oilfield gamma ray tools.

Similarly, 30 photon energies between 186 and 2448 keV have been found to produce good results for uranium.

Constructing the probability distributions for the thorium and uranium decay chains is a straightforward task. It begins with a tabulation of the isotopes in the decay chains. Then, the emitted gamma rays and their corresponding intensities (photons emitted per decay) are added to the table. After that, the branching ratio (fraction of decays that produce the isotope) is added to the table for each isotope in the decay chain. In most cases, the branching ratio will be 1, however, the thorium decay series branches along two separate paths beginning with the $^{212}$Bi isotope. Next, the product of the branching ratio and gamma ray intensity is computed to obtain the relative intensity of each gamma ray emitted in the decay chain. The computed relative intensities represent the probability a gamma ray of the corresponding energy would be produced per decay within the chain. The tabulation may then be discriminated as outlined herein to reduce the number of gamma ray energies sampled during the Monte Carlo simulation which will improve computational efficiency.

In certain illustrative methods of the present disclosure, to simulate a mixed source comprised of thorium, uranium, and potassium, the elemental probability distributions are sampled according to the specific photon activities and concentrations of the elements. Specific photon activities, $P_\gamma$, for each elemental source can be calculated from the generalized equation for a secular decay series consisting of k isotopes, which emit n discreet gamma rays for each isotope:

$$P_\gamma = A_{sp} \sum_{j=1}^{k}\left(B(j)\sum_{i=1}^{n(k)} I_i\right) = \frac{\ln(2)N_A}{M_P t_{1/2}} \sum_{j=1}^{k}\left(B(j)\sum_{i=1}^{n(k)} I_i\right), \quad \text{Eq. (2)}$$

where $A_{sp}$ is the specific activity of the parent, or decay series elemental source, in Bq/gm; B(j) is the branching ratio, or fraction of decays taking a particular path for isotope j; and $I_i$ is the intensity of gamma emission i from isotope j expressed in photons/decay; $N_A$ is Avogadro's number; $M_P$ is the atomic mass of the series parent isotope in gm/mole; and $t_{1/2}$ is the half-life of the series parent isotope in seconds.

Based upon the list of assembled gamma emissions for each elemental source (e.g., gathered from the Table of Radioactive Isotopes) and Equation 2 above, the calculated specific photon activities for natural potassium and the thorium and uranium decays series are 3.41 photons/sec/gm K, 10582.4348 photons/sec/gm Th, and 28115.737 photons/sec/gm U. For a mixed source consisting of 4.74% potassium, 4.15 ppm uranium, and 19.65 ppm thorium, the elemental source specific photon activities needed to construct a mixed source probability distribution can be calculated as shown below:

0.0474 gm K/gm×3.41 K photons/sec/gm
K=0.161634 photons/sec/gm 0.00000415 gm U/gm×28115.737 U photons/sec/gm
U=0.11668 photons/sec/gm 0.00001965 gm Th/gm×10582.4348 Th photons/sec/
gm Th=0.207945 photons/sec/gm            Eq. (3), where the right-hand side of Equation 3 represents each element's contribution to the total formation photon activity of 0.486259 photons/sec/gm. The mixed source probability distribution is obtained when the individual photon activity contributions are normalized to the total photon activity. As such, in this example, 33.2% of the time the 1.46 MeV potassium gamma ray will be sampled by the model; 24% of the time the uranium elemental probability distribution will be sampled; and 42.8% of the time the thorium elemental probability distribution will be sampled. Here, also note how the individual elemental probability distributions are combined to form the mixed source probability distribution.

An accurate portrayal of the API pit low activity and high activity radiation sources is essential. While the physical dimensions of the pit geometry are clear from Belknap's publication, other details such as the actual concentrations of thorium, uranium, and potassium are not well-defined. Cement samples that were collected when the high activity zone was poured were submitted to three different laboratories for gamma ray spectroscopy analysis and documented in Belknap's publication. The API sub-committee that oversaw the facility construction settled on assigning absolute concentrations of 24 ppm thorium, 13 ppm uranium, and 4% potassium to the official calibration point in the high activity zone based on the laboratory results. Over the years, these values have been erroneously equated with a source mixture that represents 200 API units because they ignore the non-zero elemental concentrations present in the low activity zone.

The Table 1 below lists average elemental concentrations for the low and high activity zones obtained from measurements done with four different spectral gamma ray tool configurations dating back to 2004. These results were obtained by weighted least-squares fitting of the measured spectra for gamma ray energies exceeding approximately 511 keV, and by applying a source strength adjustment to compensate for gamma ray absorption in the steel casing.

TABLE 1

| Zone | Thorium (ppm) | Uranium (ppm) | Potassium (%) |
|---|---|---|---|
| High Activity | 21.61 | 12.88 | 3.59 |
| Low Activity | 2.94 | 1.24 | 0.1 |

As can be seen, the high activity concentration values above differ substantially from the results reported from laboratory analysis of the cement samples. The cause for the difference is unknown at this time. For the purpose of defining source mixtures to model the gamma ray pit in the illustrative methods described herein, the in situ values in Table 1 are regarded as the best information available at this time. However, should additional data become available at a later date, those ordinarily skilled in the art having the benefit of this disclosure will realize that such data may integrated into the methods described herein and, therefore, are considered within the scope of this disclosure.

Still referencing block 402 of method 400, the illustrative embodiments described herein provide a number of methods, or tallies, to count the number of transported particles that score in various ways. For scintillation counters, the model may employ an F8 tally to score the amount of energy deposited in the detector. If a multi-channel pulse-height spectrum is desired, a set of energy bins, or channels, can be specified and the tally will capture the number of events that score in each channel. In any event, the bookkeeping method used by the MCNP models described herein count the number of scoring events per particle tracked.

The tally results, however, must undergo a unit conversion so they can be expressed in terms of counting rates which can be compared directly with experimental data. Thus, in certain illustrative methods described herein, the conversion is handled within the MCNP model by specifying a tally multiplier appropriate to the simulation. The tally multiplier, $M_t$, may be calculated from:

$$M_t = A_s V_s \rho_b \qquad \text{Eq. (4),}$$

where $A_s$ is the total photon specific activity of the simulated source in photons/sec/gm; $V_s$ is the sampled volume of the source region in cm$^3$; and $\rho_b$ is the bulk density of the source material in gm/cm$^3$. For a given source mixture, $A_s$ is the sum of the elemental photon specific activities, i.e., the sum of the right-hand side of Equation 3. Belknap's publication provides a value which is equates to 1.467 gm/cm$^3$ for the bulk density of the cement mixture, $\rho_b$; all three zones 12a-c (FIG. 1) in API gamma ray pit 10 are assumed to be of equal density. Accordingly, the MCNP models described herein apply the tally multiplier $M_t$ to thereby convert the tally results into absolute counting rates at block 402. The tally factor may then be applied to further modeling to convert the tallies in real-time or applied to the tallies after modeling is complete.

Still referring to FIG. 4, once the counting rates have been determined, an API unit sensitivity factor may then be calculated using the foregoing gamma ray emissions data at block 404. Here, the API unit sensitivity factor is defined using Equation 1 above whereby 200 is divided by the difference in counting rates for the high and low activity zones. Thereafter, when a logging tool is deployed (having the same design as the simulated tool), the API unit sensitivity factor may be applied to its counting rate response, thereby converting the response to API units.

In an alternative method of the present disclosure, instead of using a high and low activity zone counting rate to determine the API unit sensitivity factor, a single activity zone may be utilized. For example, a single activity zone characterized by a source mixture equivalent to the difference of the high- and low-activity zone elemental concentrations listed in Table 1 could be simulated to determine the API unit sensitivity factor. However, note that if the logging instruments response includes a noise component, the resulting calibrations may be flawed. Thus, the two-point (i.e., high and low activity zone) differential signal procedure described above is preferred in most instances since it cancels out instrument noise.

In certain other illustrative embodiments, a description of the cement mixture used to construct the API gamma ray pit is also required for the Monte Carlo modeling. The information contained in Table 9 of Belknap's publication may be used to calculate weight fractions of the constituents and, in turn, the cement description for the MCNP model.

Figure 5A:
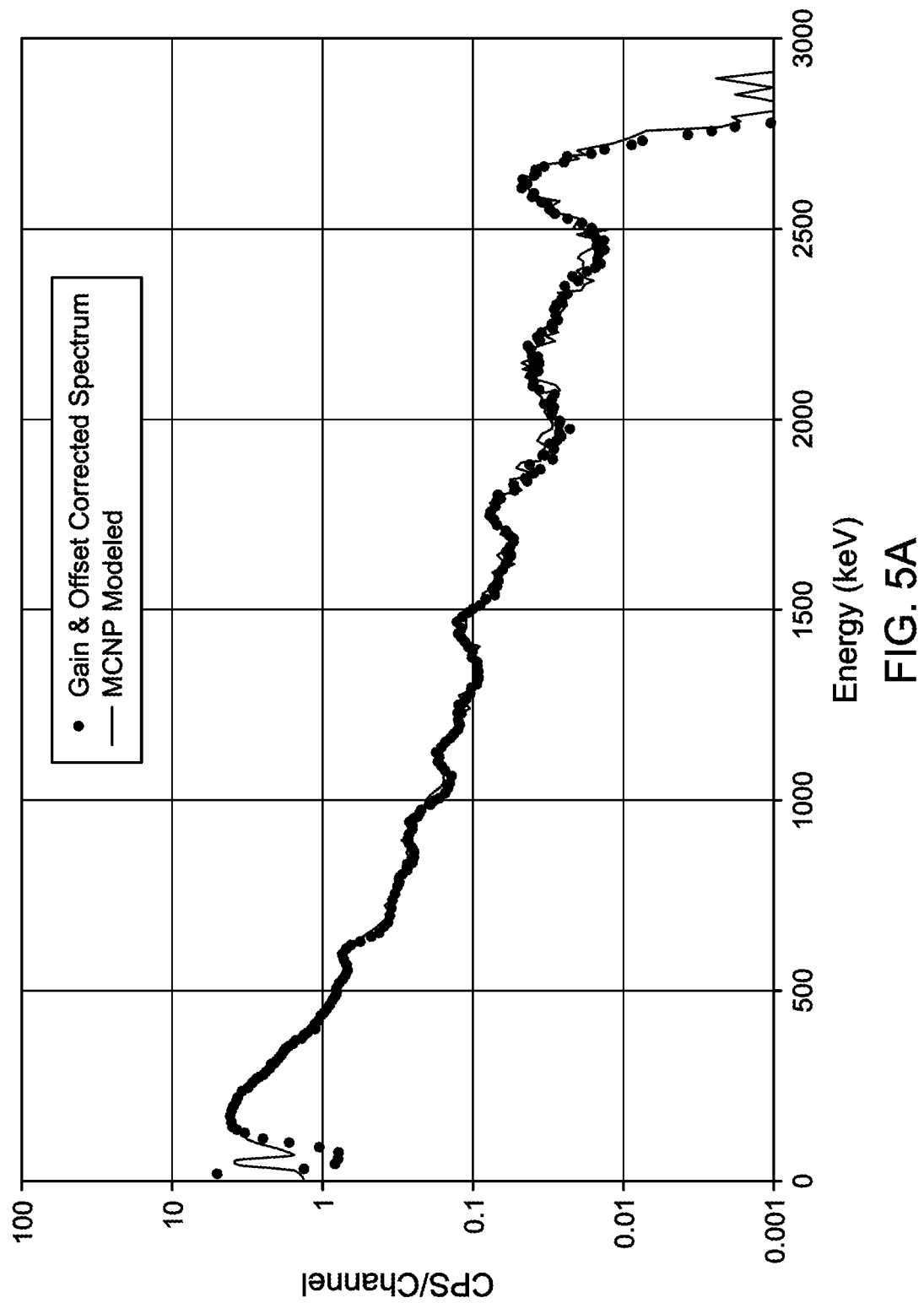
FIGS. 5A and 5B are graphs of measured spectra obtained using gamma ray tools deployed within the API Calibration Facility gamma ray pit at the center of the low (FIG. 5A) and high (FIG. 5B) activity zones.
Figure 5B:
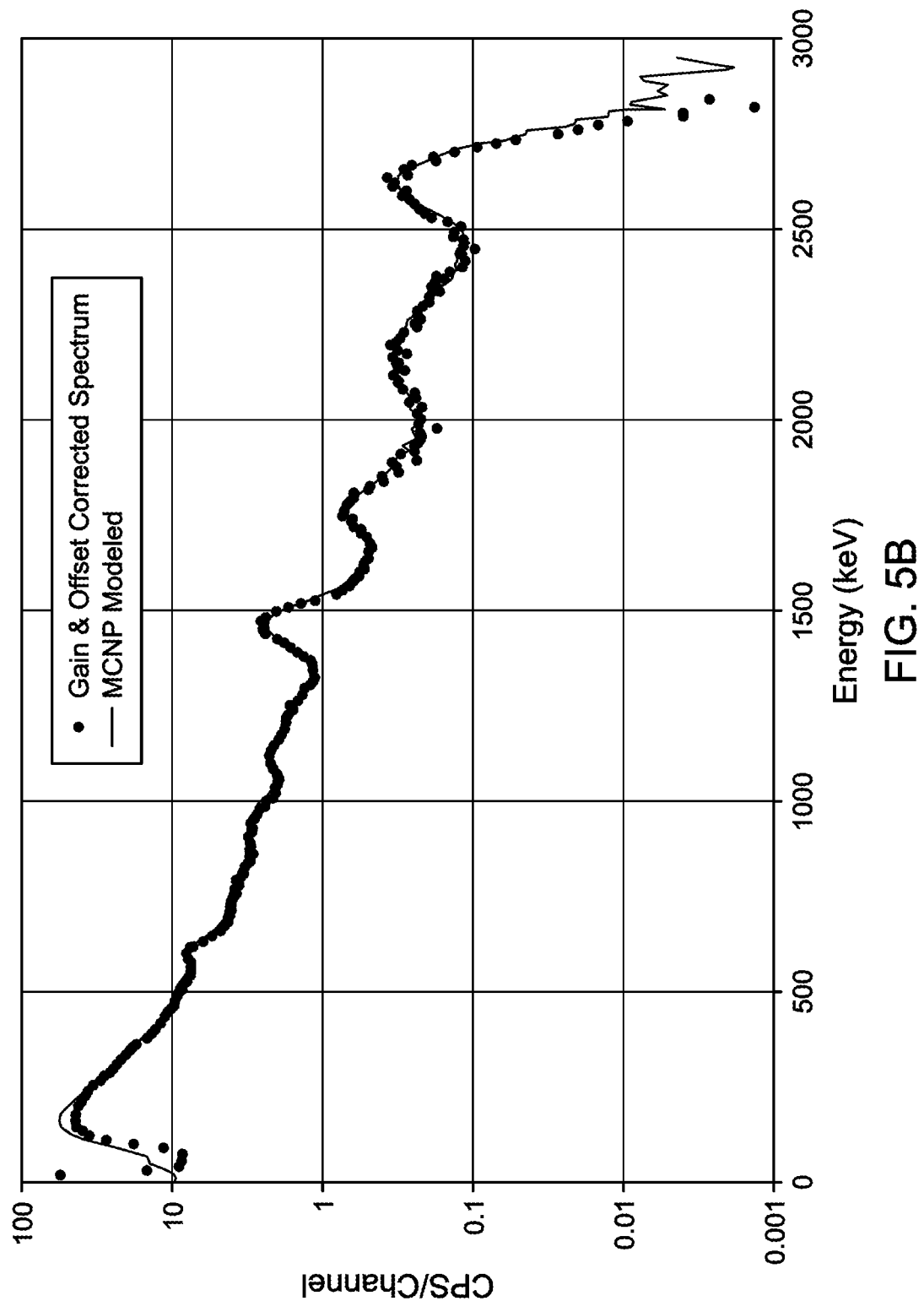

FIGS. 5A and 5B are graphs of measured spectra obtained using gamma ray tools deployed within the API Calibration Facility gamma ray pit at the center of the low (FIG. 5A) and high (FIG. 5B) activity zones. The graphs plot the counts per second/channel vs. the gamma ray energy in keV. Also, in FIGS. 5A and 5B, MCNP simulated pulse-height spectrum data (i.e., counting rates) of the present disclosure are also plotted in the graphs for comparison purposes. The black curves are measured spectra that were obtained with one spectral gamma ray tools during a 30-minute interval from the low and high activity zones. As can be seen, the MCNP-simulated pulse-height spectra of the present disclosure, represented by the dots, are in good agreement with the measured data and they validate the method above used to generate an illustrative API gamma ray pit model.

In an alternative application and embodiment of the present disclosure, a logging tool too large to fit within the API Calibration Facility gamma ray pit may also be calibrated. As previously discussed, most LWD tools do not fit the API gamma ray pit which makes it difficult to calibrate the LWD tools using conventional approaches so their responses are compatible with wireline logs. Accordingly, certain illustrative methods of the present disclosure provide a way to overcome this obstacle. Here, digital proxy formation standards whose geometry can accommodate over-sized wireline or LWD tools are created instead of massive physical formations. As will be described below, a plurality of digital formation standards are created as may be appropriate for tools of different size.

The proxy method builds off of block 402 of method 400. In this method, one or more activity zones as described above are again simulated, and corresponding counting rates for a first logging tool that fits the API gamma ray pit are calculated. A first API sensitivity factor is then calculated based on these pit simulations. Next, a first uncased proxy formation model whose borehole size matches a reference logging condition of the first logging tool is modeled. The reference logging conditions are defined by a combination of borehole size, borehole fluid, and the position of the tool within the borehole, i.e., centered or eccentered. For example, the reference logging conditions may depend on choices made by a service company, but often for wireline tools it is an eccentered tool in a freshwater-filled, 8-in. diameter borehole. Using the first proxy model, a second counting rate of the first logging tool is calculated and converted to API units using the first API unit sensitivity factor. A second uncased proxy formation model is then simulated whose borehole size matches the reference logging condition for a second over-sized logging tool. A third counting rate is then calculated using the second proxy formation model for the over-sized tool, whereby a second API unit sensitivity factor is calculated using the third counting rate and the API unit calculated from the second counting rate of the first logging tool. The second API sensitivity factor may then be applied to convert counting rate responses of logging tools deployed which match the design of the simulated over-sized tool, thereby converting the responses to API units.

In certain illustrative methods, the uncased proxy formation models described above may be comprised of the same formation materials and mixed-source definitions as those used in the earlier embodiments described herein, but having a freshwater-filled, 8-inch borehole. In other embodiments, alternative formation materials and mixed source definitions may also be used to create digital proxy formation standards as may be desirable. Moreover, the proxy model approach allows use of the single-point (i.e., single activity zone) simulation approach to determine the API unit sensitivity factor because systematic instrument noise is not included in the Monte Carlo simulation.

Although the embodiments described herein employ the Los Alamos National Laboratory computer code MCNP to carry out simulations of natural gamma ray tool responses, other Monte Carlo photon transport methods may also be used. For example, version 4CP2 of MCNP may be applied for the calculations because it has been shown to successfully model responses of tools that use scintillation or Geiger-Muller detectors.

Moreover, as previously described, the tally multiplier is applied by the MCNP model to convert the tallied results into absolute counting rates that compare directly with measured counting rates obtained with the simulated tool hardware. In certain illustrative alternative embodiments, the tally results are converted to counting rates after the simulation is completed.

The illustrative embodiments described herein relate to the simulating of gamma ray emission responses of logging tools in the API Gamma Ray Calibration Facility. However, the present disclosure is also applicable to simulating responses to any mixed-source environment, such as, for example, those that may be used to calibrate the elemental responses of natural gamma ray spectroscopy tools.

In view of the foregoing, experimental proof of the present disclosure will now be discussed. While the results shown in FIGS. 5A and 5B are quite positive, they are somewhat circular because the measured pulse-height spectra were used to obtain a set of elemental concentrations that were included in the average elemental concentrations for the low and high activity zones. A better demonstration to prove the illustrative methods herein produce valid results comes from using the methods to simulate other logging tools that did not play a part in developing the API gamma ray pit model.

Accordingly, the MCNP models described herein were used to simulate responses of two gross-counting wireline gamma ray tools with scintillation detectors and a LWD gamma ray sonde with Geiger-Muller counters. FIG. 6 shows a Table 2 which summarizes the results and compares the simulated sensitivity factors with values derived from actual measurements (i.e., counting rate responses) done with the tools in the API gamma ray pit. The difference between the modeled and experimental sensitivity factors for these tools is significantly less than the variance frequently observed among production tools of the same design/configuration.

The digital proxy calibration techniques described herein were also used to predict the responses of the three tools listed in Table 2 for existing or former laboratory formations. Digital proxy formation models were created for two different granite block formations by using elemental concentration values from wireline spectral gamma ray measurements. Predicted API unit responses were calculated using the simulated digital proxy formation counting rates and the modeled sensitivity factors from Table 2. The predicted results compare favorably with measured API unit values as shown in Table 3 of FIG. 7 to demonstrate the viability of the digital proxy calibration methods described herein.

Figure 8:
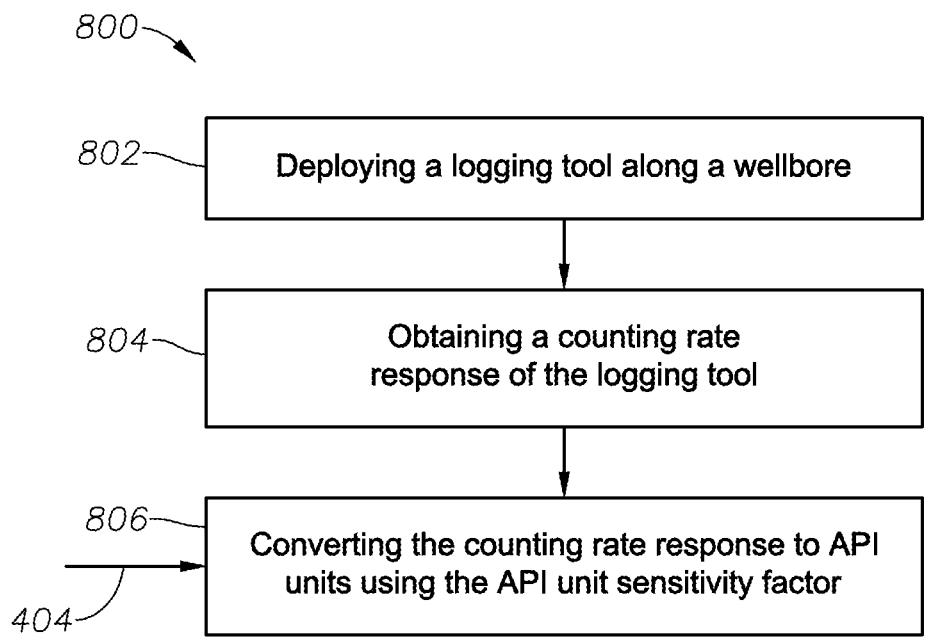
FIG. 8 is a flow chart of a method for using a gamma ray logging tool, in accordance to certain illustrative methods of the present disclosure.

Now that experimental data has been discussed, various illustrative applications of the present disclosure will now be described. FIG. 8 is a method of using a logging tool, in accordance to certain illustrative methods of the present disclosure. At block 802 of method 800, a logging tool designed in accordance to a simulated logging tool herein is deployed along a wellbore. At block 804, a photon (gamma ray) counting rate response of the logging tool is acquired using one or more sensors on the logging tool. Once acquired, at block 806 processing circuitry embodying the Monte Carlo methods described herein, and coupled to the sensors, converts the counting rate response to API units using the API unit sensitivity factor (e.g., from block 404 of method 400).

Figure 9:
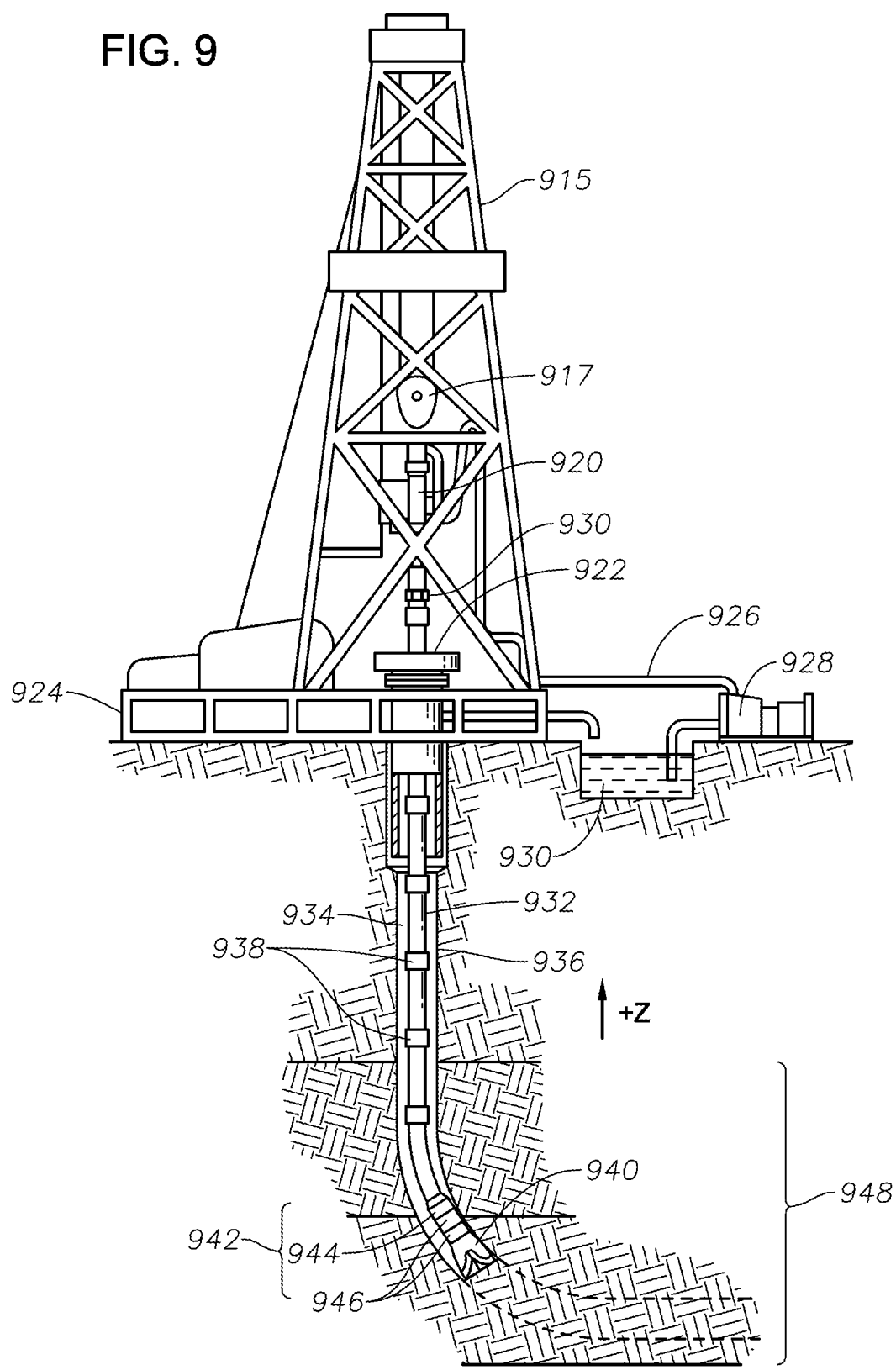
FIG. 9 shows a logging-while-drilling environment in which gamma ray logging tools of the present disclosure may be deployed.

FIG. 9 shows a drilling environment in which the present disclosure may be applied, according to certain illustrative embodiments of the present disclosure. The drilling environment includes a drilling platform 924 that supports a derrick 915 having a traveling block 917 for raising and lowering a drill string 932. A drill string kelly 920 supports the rest of drill string 932 as it is lowered through a rotary table 922. Rotary table 922 rotates drill string 932, thereby turning drill bit 940. As bit 940 rotates, it creates a borehole 936 that passes through various formations 948. A pump 928 circulates drilling fluid through a feed pipe 926 to kelly 920, downhole through the interior of drill string 932, through orifices in drill bit 940, back to the surface via annulus 934 around drill string 932, and into a retention pit 930. The drilling fluid transports cuttings from borehole 936 into pit 930 and aids in maintaining the integrity of borehole 936. Various materials can be used for drilling fluid, including oil-based fluids and water-based fluids.

As shown, gamma ray logging tools 946 may be integrated into bottom-hole assembly 942 near drill bit 940. As drill bit 940 extends the borehole 936 through formation 948, logging tools 946 may collect gamma ray measurements (i.e., counting rate responses) relating to various formation properties, as well as the tool orientation and various other drilling conditions. Each of logging tools 946 may take the form of a drill collar, i.e., a thick-walled tubular that provides weight and rigidity to aid the drilling process. Logging tools 946 may also include position sensors to collect position information related to nuclear survey data. In alternative embodiments, the gamma ray sensors and/or position sensors may be distributed along drill string 932.

In some embodiments, measurements from gamma ray logging tools 946 are transferred to the surface for processing using known telemetry technologies or communication links. Such telemetry technologies and communication links may be integrated with logging tools 946 and/or other sections of drill string 932. As an example, mud pulse telemetry is one common technique for providing a communications link for transferring logging measurements to a surface receiver 930 and for receiving commands from the surface, but other telemetry techniques can also be used. In some embodiments, bottom-hole assembly 942 includes a telemetry sub 944 to transfer measurement data to the surface receiver 930 and to receive commands from the surface. In alternative embodiments, telemetry sub 944 does not communicate with the surface, but rather stores logging data for later retrieval at the surface when the logging assembly is recovered. In other embodiments, however, the processing of the gamma ray measurements may be performed onboard logging tools 946.

Figure 10:
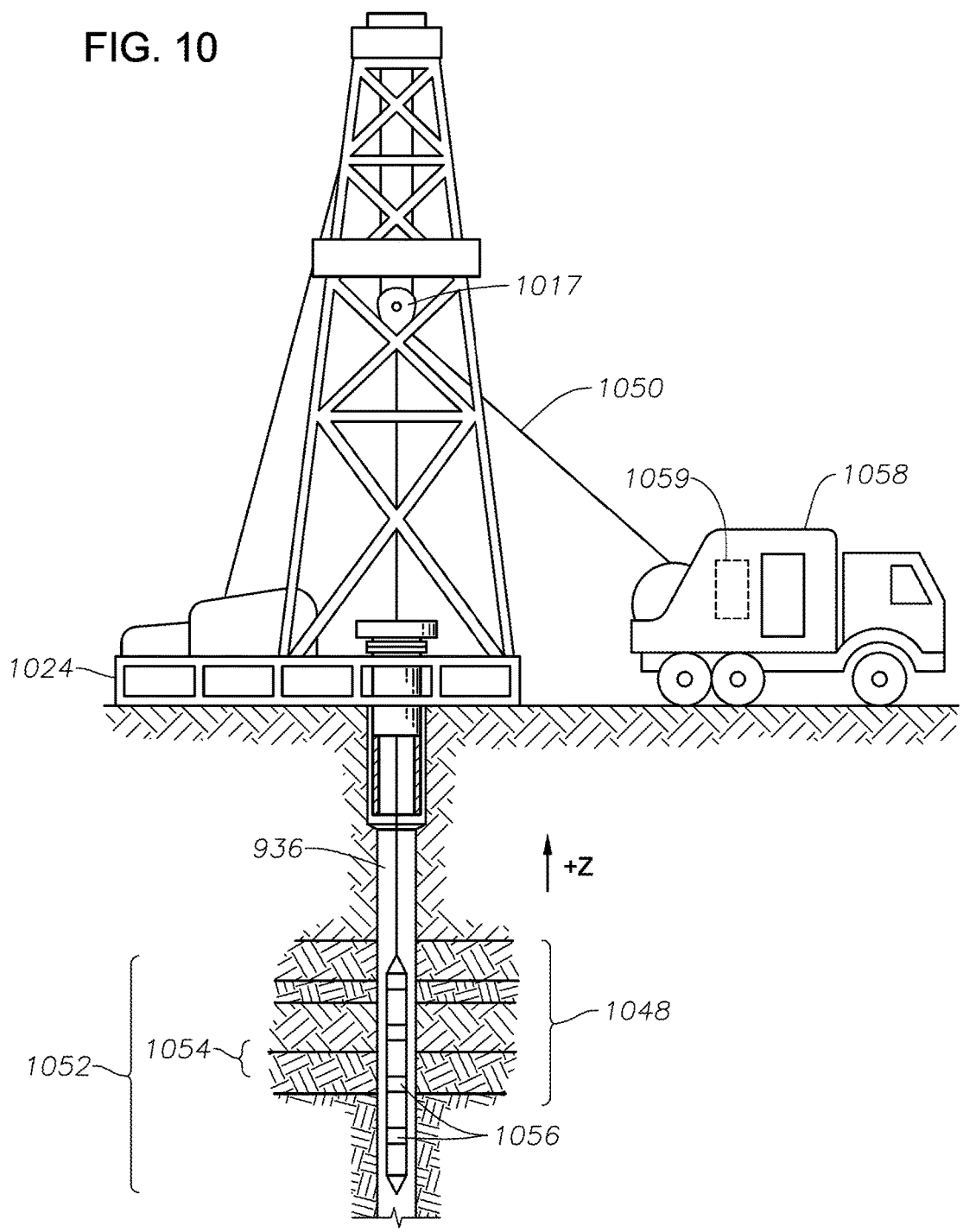
FIG. 10 shows a wireline logging environment in which gamma ray logging tools of the present disclosure may be deployed.

At various times during the drilling process, or after the drilling has been completed, drill string 932 shown in FIG. 9 may be removed from borehole 936. Once drill string 932 has been removed, as shown in FIG. 10, a wireline tool string 1052 can be lowered into borehole 936 by a cable 1050. In some embodiments, cable 1050 includes conductors and/or optical fibers for transporting power to wireline tool string 1052 and data/communications from wireline tool string 1052 to the surface. It should be noted that various types of formation property sensors can be included with wireline tool string 1052. In accordance with the disclosed Monte Carlo modeling/API unit conversion techniques, the illustrative wireline tool string 1052 includes logging sonde 1054 with gamma ray sensors and, optionally, position sensors. Gamma ray logging sonde 1054 may be attached to other tools of the wireline tool string 1052 by adaptors 1056.

In FIG. 10, a wireline logging facility 1058 receives measurements from the gamma ray sensors and/or other instruments of wireline tool string 1052 collected as wireline tool string 1052 passes through formations 1048. In some embodiments, wireline logging facility 1058 includes computing facilities 1059 for managing logging operations, for acquiring and storing measurements gathered by gamma ray logging sonde 1054, for converting counting responses to API units as described herein, and/or for displaying measurements or formation properties to an operator. In some embodiments, wireline tool string 1052 may be lowered into an open section of borehole 936 or a cased section of the borehole 936.

In addition to wireline or LWD applications, the embodiments disclosed herein may be deployed via slickline, coil tubing, measurement-while-drilling ("MWD") or other downhole tubular assemblies. Regardless of the application selected, the gamma ray logging tool sensors are coupled to processing circuitry (e.g., computer 1059 embodying an MCNP model described herein) that acts as a data acquisition and/or processing system to analyze the counting rate responses and perform the Monte Carlo modeling and/or API unit conversions described herein. Although not shown, the processing circuitry may include at least one processor, a non-transitory, computer-readable storage (also referred to herein as a "computer-program product"), transceiver/network communication module, optional I/O devices, and an optional display (e.g., user interface), all interconnected via a system bus. In one embodiment, the network communication module is a network interface card ("NIC") and communicates using the Ethernet protocol. In other embodiment, the network communication module may be another type of communication interface such as a fiber optic interface and may communicate using a number of different communication protocols. Software instructions executable by the processor for implementing software instructions in accordance with the illustrative methods described herein, may be stored in storage or some other computer-readable medium.

The processing circuitry may be connected to one or more public (e.g., the Internet) and/or private networks via one or more appropriate network connections. It will also be recognized that the software instructions may also be loaded into storage from a CD-ROM or other appropriate storage media via wired or wireless methods.

Moreover, those ordinarily skilled in the art will appreciate that embodiments of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. Embodiments of the disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system. Subject to network reliability, the Monte Carlo modeling and/or API unit conversion techniques described herein may be performed in real-time to update production, enhance oil recovery ("EOR") operations, and/or other operations.

Accordingly, the illustrative embodiments and methods described herein provide a new approach which makes it possible to digitally preserve the petroleum industry's standard definition for its basic unit of natural formation radioactivity independent of the continued existence or usability of the current physical standard. It provides a cost-effective way to calibrate the total gamma ray response of new tools by eliminating the logistics of performing measurements at the API facility pit. More importantly, the new process makes it possible to apply the digital standard to calibrate tools that do not physically fit the existing facility.

Embodiments described herein further relate to any one or more of the following paragraphs:

1. A method for calibrating a gamma ray logging tool, the method comprising: simulating gamma ray emissions of a formation; calculating an American Petroleum Institute ("API") unit sensitivity factor for a logging tool based upon the simulated gamma ray emissions; deploying the logging tool along a wellbore; obtaining a counting rate response of the logging tool; and converting the counting rate response to API units using the API unit sensitivity factor.

2. A calibration method as defined in paragraph 1, wherein the gamma ray emissions are simulated using Monte Carlo modeling.

3. A calibration method as defined in paragraphs 1 or 2, wherein simulating the gamma ray emissions comprises simulating a low activity zone of the formation and calculating a first counting rate for the low activity zone; and simulating a high activity zone of the formation and calculating a second counting rate for the high activity zone, wherein the API unit sensitivity factor is calculated based upon the first and second counting rates.

4. A calibration method as defined in any of paragraphs 1-3, wherein simulating the gamma ray emissions comprises: simulating a single activity zone of the formation; and calculating a counting rate for the single activity zone, wherein the API unit sensitivity factor is calculated based upon the counting rate.

5. A calibration method as defined in any of paragraphs 1-4, wherein simulating the gamma ray emissions comprises calculating photon activities of the gamma ray emissions for one or more elemental sources; defining an elemental probability distribution for sampling the gamma ray emissions based upon the photon activities; defining a mixed source probability distribution for sampling the gamma ray emissions based upon the elemental probability distributions; and using the mixed source probability distribution, calculating a tally multiplier to express a tally of scoring photons as a counting rate, wherein the counting rate will be utilized to calculate the API unit sensitivity factor.

6. A calibration method as defined in any of paragraphs 1-5, wherein simulating the gamma ray emissions comprises simulating one or more activity zones of the formation and calculating a first counting rate for each zone; calculating a first API unit sensitivity factor using the first counting rate; developing a first proxy formation model whose borehole size matches a reference logging condition of a first logging tool simulated to calculate the first counting rate; using the first proxy formation model, calculating a second counting rate of the first logging tool; converting the second counting rate to API units using the first API unit sensitivity factor; developing a second proxy formation model whose borehole size matches a reference logging condition of a second logging tool; and using the second proxy formation model, calculating a third counting rate of the second logging tool, wherein the API unit sensitivity factor is a second API unit sensitivity factor calculated using the third counting rate.

7. A calibration method as defined in any of paragraphs 1-6, wherein the logging tool is deployed via a wireline, slickline or tubular assembly.

8. A gamma ray logging tool, comprising one or more gamma ray emission sensors communicably coupled to processing circuitry that is operable to perform a method comprising: obtaining a counting rate response of the logging tool; and converting the counting rate response to API units using an API unit sensitivity factor obtained using any of paragraphs 1-6.

9. A gamma ray logging tool as defined in paragraph 8, wherein the processing circuitry forms part of the logging tool.

10. A gamma ray logging tool as defined in paragraphs 8 or 9, wherein the processing circuitry is remotely located from the logging tool.

11. A gamma ray logging tool as defined in any of paragraphs 8-10, wherein the logging tool forms part of a wireline, slickline or tubular assembly.

12. A calibration method for a gamma ray logging tool, the method comprising applying simulated gamma ray emission data to convert logging tool counting rate responses to American Petroleum Institute ("API") units.

13. A calibration method as defined in paragraph 12, wherein the gamma ray emission data is simulated using Monte Carlo modeling.

14. A calibration method as defined in paragraphs 12 or 13, wherein the gamma ray emission data is simulated using a method comprising: simulating a low activity zone of a formation and calculating a first counting rate for the low activity zone; and simulating a high activity zone of the formation and calculating a second counting rate for the high activity zone, wherein an API unit sensitivity factor is calculated based upon the first and second counting rates, the API unit sensitivity factor being used to convert the counting rate responses to API units.

15. A calibration method as defined in any of paragraphs 12-14, wherein the gamma ray emission data is simulated using a method comprising: simulating a single activity zone of a formation; and calculating a counting rate for the single activity zone, wherein an API unit sensitivity factor is calculated based upon the counting rate, the API unit sensitivity factor being used to convert the counting rate responses to API units.

16. A calibration method as defined in any of paragraphs 12-15, wherein the gamma ray emission data is simulated using a method comprising: calculating photon activities of the gamma ray emission data for one or more elemental sources; defining an elemental probability distribution for sampling the gamma ray emission data based upon the photon activities; defining a mixed source probability distribution for sampling the gamma ray emission data based upon the elemental probability distributions; and using the mixed source probability distribution, calculating a tally multiplier to express a tally of scoring photons as a counting rate, wherein the counting rate will be utilized to calculate the API unit sensitivity factor.

17. A calibration method as defined in any of paragraphs 12-16, wherein simulating the gamma ray emissions comprises simulating one or more activity zones of a formation and calculating a first counting rate for each zone; calculating a first API unit sensitivity factor using the first counting rate; developing a first proxy formation model whose borehole size matches a reference logging condition of a first logging tool simulated to calculate the first counting rate; using the first proxy formation model, calculating a second counting rate of the first logging tool; converting the second counting rate to API units using the first API unit sensitivity factor; developing a second proxy formation model whose borehole size matches a reference logging condition of a second logging tool; and using the second proxy formation model, calculating a third counting rate of the second logging tool, wherein the API unit sensitivity factor is a second API unit sensitivity factor calculated using the third counting rate.

18. A calibration method as defined in any of paragraphs 12-17, wherein the logging tool is deployed via a wireline, slickline or tubular assembly.

19. A method for generating a gamma ray calibration model, the method comprising simulating gamma ray emissions of a formation; and calculating an American Petroleum Institute ("API") unit sensitivity factor for a logging tool based upon the simulated gamma ray emissions.

20. A method as defined in paragraph 19, wherein the gamma ray emissions are simulated using Monte Carlo modeling.

21. A method as defined in paragraphs 19 or 20, wherein simulating the gamma ray emissions comprises simulating a low activity zone of the formation and calculating a first counting rate for the low activity zone; and simulating a high activity zone of the formation and calculating a second counting rate for the high activity zone, wherein the API unit sensitivity factor is calculated based upon the first and second counting rates.

22. A calibration method as defined in any of paragraphs 19-21, wherein simulating the gamma ray emissions comprises: simulating a single activity zone of the formation; and calculating a counting rate for the single activity zone, wherein the API unit sensitivity factor is calculated based upon the counting rate.

23. A calibration method as defined in any of paragraphs 19-22, wherein simulating the gamma ray emissions comprises calculating photon activities of the gamma ray emissions for one or more elemental sources; defining an elemental probability distribution for sampling the gamma ray emissions based upon the photon activities; defining a mixed source probability distribution for sampling the gamma ray emissions based upon the elemental probability distributions; and using the mixed source probability distribution, calculating a tally multiplier to express a tally of scoring photons as a counting rate, wherein the counting rate will be utilized to calculate the API unit sensitivity factor.

24. A calibration method as defined in any of paragraphs 19-23, wherein simulating the gamma ray emissions comprises simulating one or more activity zones of the formation and calculating a first counting rate for each zone; calculating a first API unit sensitivity factor using the first counting rate; developing a first proxy formation model whose borehole size matches a reference logging condition of a first logging tool simulated to calculate the first counting rate; using the first proxy formation model, calculating a second counting rate of the first logging tool; converting the second counting rate to API units using the first API unit sensitivity factor; developing a second proxy formation model whose borehole size matches a reference logging condition of a second logging tool; and using the second proxy formation model, calculating a third counting rate of the second logging tool, wherein the API unit sensitivity factor is a second API unit sensitivity factor calculated using the third counting rate.

25. A system for calibrating a gamma ray logging tool, the system comprising a logging tool having one or more gamma ray sensors therein; and processing circuitry communicably coupled to the logging tool and operable to perform operations comprising applying simulated gamma ray emission data to convert logging tool counting rate responses to American Petroleum Institute ("API") units.

26. A system as defined in paragraph 25, wherein the gamma ray emission data is simulated using Monte Carlo modeling.

27. A system as defined in paragraphs 25 or 26, wherein the gamma ray emission data is simulated using a method comprising simulating a low activity zone of a formation and calculating a first counting rate for the low activity zone; and simulating a high activity zone of the formation and calculating a second counting rate for the high activity zone, wherein an API unit sensitivity factor is calculated based upon the first and second counting rates, the API unit sensitivity factor being used to convert the counting rate responses to API units.

28. A system as defined in any of paragraphs 25-27, wherein the gamma ray emission data is simulated using a method comprising simulating a single activity zone of a formation; and calculating a counting rate for the single activity zone, wherein an API unit sensitivity factor is calculated based upon the counting rate, the API unit sensitivity factor being used to convert the counting rate responses to API units.

29. A system as defined in any of paragraphs 25-28, wherein the gamma ray emission data is simulated using a method comprising calculating photon activities of the gamma ray emission data for one or more elemental sources; defining an elemental probability distribution for sampling the gamma ray emission data based upon the photon activities; defining a mixed source probability distribution for sampling the gamma ray emission data based upon the elemental probability distributions; and using the mixed source probability distribution, calculating a tally multiplier to express a tally of scoring photons as a counting rate, wherein the counting rate will be utilized to calculate the API unit sensitivity factor.

30. A system as defined in any of paragraphs 25-30, wherein simulating the gamma ray emissions comprises simulating one or more activity zones of a formation and calculating a first counting rate for each zone; calculating a first API unit sensitivity factor using the first counting rate; developing a first proxy formation model whose borehole size matches a reference logging condition of a first logging tool simulated to calculate the first counting rate; using the first proxy formation model, calculating a second counting rate of the first logging tool; converting the second counting rate to API units using the first API unit sensitivity factor; developing a second proxy formation model whose borehole size matches a reference logging condition of a second logging tool; and using the second proxy formation model, calculating a third counting rate of the second logging tool, wherein the API unit sensitivity factor is a second API unit sensitivity factor calculated using the third counting rate.

31. A system as defined in any of paragraphs 25-30, wherein the logging tool is deployed via a wireline, slickline or tubular assembly.

32. A system for generating a gamma ray calibration model, the system comprising processing circuitry operable to perform operations comprising simulating gamma ray emissions of a formation; and calculating an American Petroleum Institute ("API") unit sensitivity factor for a logging tool based upon the simulated gamma ray emissions.

33. A system as defined in paragraph 32, wherein the gamma ray emissions are simulated using Monte Carlo modeling.

34. A system as defined in paragraphs 32 or 33, wherein simulating the gamma ray emissions comprises simulating a low activity zone of the formation and calculating a first counting rate for the low activity zone; and simulating a high activity zone of the formation and calculating a second counting rate for the high activity zone, wherein the API unit sensitivity factor is calculated based upon the first and second counting rates.

35. A system as defined in any of paragraphs 32-34, wherein simulating the gamma ray emissions comprises simulating a single activity zone of the formation; and calculating a counting rate for the single activity zone, wherein the API unit sensitivity factor is calculated based upon the counting rate.

36. A system as defined in any of paragraphs 32-35, wherein simulating the gamma ray emissions comprises calculating photon activities of the gamma ray emissions for one or more elemental sources; defining an elemental probability distribution for sampling the gamma ray emissions based upon the photon activities; defining a mixed source probability distribution for sampling the gamma ray emissions based upon the elemental probability distributions; and using the mixed source probability distribution, calculating a tally multiplier to express a tally of scoring photons as a counting rate, wherein the counting rate will be utilized to calculate the API unit sensitivity factor.

37. A system as defined in any of paragraphs 32-36, wherein simulating the gamma ray emissions comprises simulating one or more activity zones of the formation and calculating a first counting rate for each zone; calculating a first API unit sensitivity factor using the first counting rate; developing a first proxy formation model whose borehole size matches a reference logging condition of a first logging tool simulated to calculate the first counting rate; using the first proxy formation model, calculating a second counting rate of the first logging tool; converting the second counting rate to API units using the first API unit sensitivity factor; developing a second proxy formation model whose borehole size matches a reference logging condition of a second logging tool; and using the second proxy formation model, calculating a third counting rate of the second logging tool, wherein the API unit sensitivity factor is a second API unit sensitivity factor calculated using the third counting rate.

Furthermore, the illustrative methods described herein may be implemented by a system comprising processing circuitry or a non-transitory computer readable medium comprising instructions which, when executed by at least one processor, causes the processor to perform any of the methods described herein.

Although various embodiments and methodologies have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for calibrating a gamma ray logging tool, the method comprising:
    simulating gamma ray emissions of a formation by:
        simulating a low activity zone of the formation and calculating a first counting rate for the low activity zone; and
        simulating a high activity zone of the formation and calculating a second counting rate for the high activity zone;

calculating an American Petroleum Institute ("API") unit sensitivity factor for a logging tool based upon the simulated gamma ray emissions, wherein the API unit sensitivity factor is calculated based upon the first and second counting rates;

deploying the logging tool along a wellbore;

obtaining a counting rate response of the logging tool; and converting the counting rate response to API units using the API unit sensitivity factor.

2. A calibration method as defined in claim 1, wherein the gamma ray emissions are simulated using Monte Carlo modeling.

3. A calibration method as defined in claim 1, wherein simulating the gamma ray emissions comprises:

simulating a single activity zone of the formation; and calculating a counting rate for the single activity zone, wherein the API unit sensitivity factor is calculated based upon the counting rate.

4. A calibration method as defined in claim 1, wherein simulating the gamma ray emissions comprises:

calculating photon activities of the gamma ray emissions for one or more elemental sources;

defining an elemental probability distribution for sampling the gamma ray emissions based upon the photon activities;

defining a mixed source probability distribution for sampling the gamma ray emissions based upon the elemental probability distributions; and using the mixed source probability distribution, calculating a tally multiplier to express a tally of scoring photons as a counting rate, wherein the counting rate will be utilized to calculate the API unit sensitivity factor.

5. A calibration method as defined in claim 1, wherein simulating the gamma ray emissions comprises:

simulating one or more activity zones of the formation and calculating a first counting rate for each zone;

calculating a first API unit sensitivity factor using the first counting rate;

developing a first proxy formation model whose borehole size matches a reference logging condition of a first logging tool simulated to calculate the first counting rate;

using the first proxy formation model, calculating a second counting rate of the first logging tool;

converting the second counting rate to API units using the first API unit sensitivity factor;

developing a second proxy formation model whose borehole size matches a reference logging condition of a second logging tool; and using the second proxy formation model, calculating a third counting rate of the second logging tool, wherein the API unit sensitivity factor is a second API unit sensitivity factor calculated using the third counting rate.

6. A gamma ray logging tool, comprising:

one or more gamma ray emission sensors communicably coupled to processing circuitry that is operable to perform a method comprising:

obtaining a counting rate response of the logging tool; and converting the counting rate response to API units using an API unit sensitivity factor obtained using any of methods 1-6.

7. A calibration method as defined in claim 1, wherein the logging tool is deployed via a wireline, slickline or tubular assembly.

8. A method for generating a gamma ray calibration model, the method comprising:

simulating gamma ray emissions of a formation by:

simulating a low activity zone of the formation and calculating a first counting rate for the low activity zone; and simulating a high activity zone of the formation and calculating a second counting rate for the high activity zone; and calculating an American Petroleum Institute ("API") unit sensitivity factor for a logging tool based upon the simulated gamma ray emissions, wherein the API unit sensitivity factor is calculated based upon the first and second counting rates.

9. A method as defined in claim 8, wherein the gamma ray emissions are simulated using Monte Carlo modeling.

10. A method as defined in claim 9, wherein simulating the gamma ray emissions comprises:

simulating a single activity zone of the formation; and calculating a counting rate for the single activity zone, wherein the API unit sensitivity factor is calculated based upon the counting rate.

11. A method as defined in claim 9, wherein simulating the gamma ray emissions comprises:

calculating photon activities of the gamma ray emissions for one or more elemental sources;

defining an elemental probability distribution for sampling the gamma ray emissions based upon the photon activities;

defining a mixed source probability distribution for sampling the gamma ray emissions based upon the elemental probability distributions; and using the mixed source probability distribution, calculating a tally multiplier to express a tally of scoring photons as a counting rate, wherein the counting rate will be utilized to calculate the API unit sensitivity factor.

12. A method as defined in claim 9, wherein simulating the gamma ray emissions comprises:

simulating one or more activity zones of the formation and calculating a first counting rate for each zone;

calculating a first API unit sensitivity factor using the first counting rate;

developing a first proxy formation model whose borehole size matches a reference logging condition of a first logging tool simulated to calculate the first counting rate;

using the first proxy formation model, calculating a second counting rate of the first logging tool;

converting the second counting rate to API units using the first API unit sensitivity factor;

developing a second proxy formation model whose borehole size matches a reference logging condition of a second logging tool; and using the second proxy formation model, calculating a third counting rate of the second logging tool, wherein the API unit sensitivity factor is a second API unit sensitivity factor calculated using the third counting rate.

13. A non-transitory computer program product comprising instructions which, when executed by at least one processor, causes the processor to perform any of the methods in claims 1 or 9.

14. A system for calibrating a gamma ray logging tool, the system comprising:

a logging tool having one or more gamma ray sensors therein; and processing circuitry communicably coupled to the logging tool and operable to perform operations comprising applying simulated gamma ray emission data to convert logging tool counting rate responses to American Petroleum Institute ("API") units, wherein the conversion is achieved by:
- simulating a low activity zone of a formation and calculating a first counting rate for the low activity zone;
- simulating a high activity zone of the formation and calculating a second counting rate for the high activity zone;
- calculating an API unit sensitivity factor for a logging tool based upon the first and second counting rates;
- deploying the logging tool along a wellbore;
- obtaining a counting rate response of the logging tool; and
- converting the counting rate response to API units using the API unit sensitivity factor.

15. A system for generating a gamma ray calibration model, the system comprising processing circuitry operable to perform operations comprising:
- simulating gamma ray emissions of a formation by:
  - simulating a low activity zone of the formation and calculating a first counting rate for the low activity zone; and
  - simulating a high activity zone of the formation and calculating a second counting rate for the high activity zone; and
- calculating an American Petroleum Institute ("API") unit sensitivity factor for a logging tool based upon the simulated gamma ray emissions, wherein the API unit sensitivity factor is calculated based upon the first and second counting rates.

16. A system as defined in claim 15, wherein the gamma ray emissions are simulated using Monte Carlo modeling.

17. A system as defined in claim 15, wherein simulating the gamma ray emissions comprises:
- simulating a single activity zone of the formation; and
- calculating a counting rate for the single activity zone,
wherein the API unit sensitivity factor is calculated based upon the counting rate.

18. A system as defined in claim 15, wherein simulating the gamma ray emissions comprises:
- calculating photon activities of the gamma ray emissions for one or more elemental sources;
- defining an elemental probability distribution for sampling the gamma ray emissions based upon the photon activities;
- defining a mixed source probability distribution for sampling the gamma ray emissions based upon the elemental probability distributions; and
- using the mixed source probability distribution, calculating a tally multiplier to express a tally of scoring photons as a counting rate,
wherein the counting rate will be utilized to calculate the API unit sensitivity factor.

19. A system as defined in claim 15, wherein simulating the gamma ray emissions comprises:
- simulating one or more activity zones of the formation and calculating a first counting rate for each zone;
- calculating a first API unit sensitivity factor using the first counting rate;
- developing a first proxy formation model whose borehole size matches a reference logging condition of a first logging tool simulated to calculate the first counting rate;
- using the first proxy formation model, calculating a second counting rate of the first logging tool;
- converting the second counting rate to API units using the first API unit sensitivity factor;
- developing a second proxy formation model whose borehole size matches a reference logging condition of a second logging tool; and
- using the second proxy formation model, calculating a third counting rate of the second logging tool,
wherein the API unit sensitivity factor is a second API unit sensitivity factor calculated using the third counting rate.

* * * * *